United States Patent [19]

Habig et al.

[11] 3,929,891

[45] Dec. 30, 1975

[54] REDUCTION OF HALONITROAROMATES USING SULFITED PLATINUM ON CARBON CATALYSTS

[75] Inventors: Kurt Habig; Konrad Baessler, both of Frankfurt am Main, Germany

[73] Assignee: Hoechst Aktiengesellschaft, Frankfurt am Main, Germany

[22] Filed: Dec. 10, 1973

[21] Appl. No.: 423,298

Related U.S. Application Data

[62] Division of Ser. No. 223,783, Feb. 4, 1972, Pat. No. 3,803,054.

[30] Foreign Application Priority Data

Feb. 8, 1971 Germany............................ 2105682
Feb. 8, 1971 Germany............................ 2105780

[52] U.S. Cl................................. 260/580; 260/580
[51] Int. Cl.²......................................... C07C 85/11
[58] Field of Search..................................... 260/580

[56] References Cited
UNITED STATES PATENTS 3,350,450 10/1967 Dovell et al. .................. 260/580 X
3,761,425 9/1973 Baessler et al.................. 260/580 X

FOREIGN PATENTS OR APPLICATIONS 1,280,258 10/1968 Germany ............................ 260/580

*Primary Examiner*—Lewis Gotts
*Assistant Examiner*—S. P. Williams
*Attorney, Agent, or Firm*—Connolly and Hutz

[57] ABSTRACT

Sulfited platinum on carbon catalysts being useful in the selective hydrogenation of halonitroaromatic compounds are obtained by saturating a particulate platinum on carbon catalyst with hydrogen in an acidic aqueous medium and treating it with defined amounts of a sulfitizing agent. Said catalysts maintain their activity and selectivity for numerous hydrogenations.

1 Claim, No Drawings

REDUCTION OF HALONITROAROMATES USING SULFITED PLATINUM ON CARBON CATALYSTS

This application is a division of application Ser. No. 223,783, filed Feb. 4, 1972.

The present invention relates to a process for the preparation of sulfited platinum on carbon catalysts.

U.S. Pat. No. 3,275,567 discloses a process for the preparation of sulfided platinum on carbon catalysts in which carbon particles having an active surface area greater than 800 m²/g are admixed with an aqueous solution of a platinum-(II) compound, the platinum oxide precipitated on the carbon support is reduced after an alkaline hydrolysis and the platinum on carbon catalyst obtained is treated with a sulfidizing agent, for example gaseous hydrogen sulfide, in an aqueous suspension. The hydrogen sulfide is used in a 100 % excess over the theoretical amount required for converting the metallic platinum into PtS2. Such catalysts are especially suitable for the reductive alkylation of an arylamine with an aliphatic ketone and hydrogen. Moreover, according to a publication in J.Am. Soc. 87 (1965), p. 2767, they exhibit a pronounced selectivity for the catalytic reduction of halogenated nitroaromatic compounds to the corresponding amines without causing a substantial dehalogenation. Non sulfided platinum catalysts cannot be used for this purpose since they would cause reduction and dehalogenation at the same time.

In practice, however, it is necessary, having regard to the high cost of platinum, that the catalyst can be used several times without substantial loss of activity. Whilst the catalyst obtained in accordance with the above-cited patent is suitable for the catalytic reduction, for example, of halogenated nitroaromatic compounds, it loses its initial activity, for no perceptible reason, often after a single use already, so that it can be used, at best, a few times. This, however, questions the economic application of a reduction process. In our copending application Ser. No. 117,078, filed on Feb. 19, 1971, now U.S. Pat. No. 3,761,425 we described and claimed a process for the preparation of sulfided platinum on carbon catalysts, wherein a particulate platinum on carbon catalyst having an effective surface of at least 800 m²/g is suspended in an aqueous medium of a pH in the range of 0 to 5, saturated with hydrogen at a pressure in the range of normal pressure to 1 atmg, treated with 0.3 to 0.7 mol of a sulfidizing agent per each mol of hydrogen absorbed and isolated from the aqueous medium. Further disadvantages of the described processes are that the sulfidation reaction is preferably carried out with gaseous hydrogen sulfide which is heavily poisonous and difficult to handle. Furthermore, the preparation of the catalyst according to U.S. Pat. No. 3,275,567 is very time-consuming and the reproducibility of the special properties of the catalyst is very unreliable.

It has now been found that platinum on carbon catalysts, which have a great selectivity and reliable reproducibility and which are suitable for the catalytic reduction of halogenated nitroaromatic compounds, can be obtained by suspending a particulate platinum on carbon catalyst having an active surface area of preferably at least 800 m²/g in an acid aqueous medium, saturating the catalyst with hydrogen at normal or slightly elevated pressure and admixing the aqueous solution of a sulfitizing agent with the proviso that 0.3 to 0.7 equivalents of sulfitizing agent are absorbed per mol of hydrogen absorbed by the catalyst. The platinum catalyst thus treated is then isolated in known manner.

The catalyst of the invention preserves its activity and selectivity even after many reduction batches; it can, therefore, also be used on an industrial scale and is economic.

As starting material for the preparation of a sulfited platinum on carbon catalyst, commercial platinum on carbon catalysts can be used either as a dry powder or moist with water.

These catalysts suitably contain from about 1 to 10 % by weight, preferably about 4 to 6 % by weight, of metallic platinum. As starting material there are advantageously used such catalysts in which the finely divided metallic platinum has a medium crystallite size of less than 20 Angstrom units and a metal surface of from about 6 to 12 m²/g, perferably about 8 to 12 m²/g. Moreover, the carbon support of the platinum catalyst advantageously has a particle size distribution such that at least 40 % by weight thereof have a diameter of less than 20 microns.

Some preferable embodiments of the process of the invention are given hereinafter:

The particulate platinum on carbon catalyst is suspended in an aqueous medium of a pH of about 0 to 4. The weight of ratio of catalyst (dry basis) to aqueous medium is advantageously between 1 : 5 and 1 : 20. To adjust the pH-value to the above-indicated range, non oxidizing acids, especially non oxidizing mineral acids, such as hydrohalic acids, sulfuric acid and phosphoric acid, or lower aliphatic carboxylic acids, such as formic acid, acetic acid or propionic acid, may be used, preferably sulfuric acid. Hydrogen is then, while stirring, fed in or on the suspension of the catalyst thus obtained until saturation is reached. During this operation elementary hydrogen is occluded by the finely divided platinum metal until saturation. The temperature maintained during saturation is advantageously between about 10° and 50°C, preferably between 20° and 30°C. Saturation with hydrogen is preferably performed at normal pressure, but slightly elevated pressure may also be applied. The amount of hydrogen absorbed under these conditions is generally between about 450 and 550 cc. of hydrogen at 25°C, calculated on 1 g of metallic platinum (the indicated saturation value is referred to normal pressure). Generally, a period of from about 30 to about 60 minutes is required for the hydrogen saturation.

Subsequently, an aqueous solution of a sulfitizing agent is admixed with the suspension thus obtained of the platinum catalyst saturated with hydrogen. For this, it is important that the sulfitizing agent is used in such an amount that about 0.3 to 0.7 equivalents, preferably 0.5 to 0.6 equivalents, of sulfitizing agent are absorbed by the catalyst per mol of hydrogen absorbed by the catalyst. The temperature is advantageously between about 10° and 50°C, preferably between about 20° and 30°C.

As sulfitizing agents there may be preferably used ammonium or alkali metal sulfites and $SO_2$. The corresponding hydrogensulfites and metabisulfites (=disulfites or pyrosulfites) may, however, also be used. The indicated compounds are advantageously fed while stirring in the form of aqueous solutions having a content of from about 0.5 to 10 % by weight, preferably from about 1 to 5 % by weight, in the suspension of the platinum catalyst saturated with hydrogen.

The sulfited platinum on carbon catalyst thus obtained is separated, e.g., by filtration, from the liquid and washed with distilled water. The catalyst is thus obtained with a water content of about 50 % and is preferably used in this moist state.

The catalyst prepared according to the invention is especially suitable for the reduction of halogenated nitroaromatic compounds to the corresponding amines. As halogenated nitroaromatic compounds there are preferably mentioned those compounds which carry 1, 2 or 3 halogen atoms at the nucleus or, for example, 3 fluorine atoms in a side chain, especially the compounds of the formula

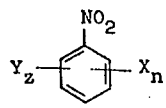

in which X stands for a halogen atom, especially a chlorine atom, Y stands for a hydrogen atom, an alkyl or alkoxy group of 1 to 4 carbon atoms each, or a trifluoromethyl group, and $n$ and $z$ each stands for an integer of 1 to 3.

The nitro compound, where required together with a solvent, and the catalyst are generally fed in a reactor, the mixture is heated to 50°– 80°C and the feed of hydrogen is started under pressure while the catalyst is suspended. The desired reaction temperature is reached with the aid of the reaction heat and suitably kept constant by cooling. The reduction is complete if there is no more reduction in hydrogen pressure observed and this can be made sure by maintaining the above-mentioned measures for another 15 to 20 minutes. To recover the catalyst the cooled reaction mixture is separated, advantageously by filtration, the catalyst is used for the next batch and the organic filtrate is worked up in known manner. The pressure and temperature used for the reduction may vary greatly, very advantageously the temperature may vary from about 50° to about 120°C and the pressure from about 5 to about 50 atmospheres gage. The temperature and, where required, the solvent chosen must be such that the reduction can proceed in the liquid phase. If solvents are required, water, lower alcohols and usual aromatic solvents, such as benzene, toluene or chlorobenzenes, may be used.

The weight ratio of nitro compound to platinum chosen may be between 10,000 : 1 and 1000 : 1; to achieve a favorable reaction rate and, at the same time, a high frequency of application of the catalyst (indicating how many time a catalyst can be used without being regenerated), a ratio of about 4000 : 1 is preferably chosen.

The process of the invention can be employed for converting a large number of halogenated aromatic nitro compounds into the corresponding halogenated aromatic amines. In most cases, it causes a dehalogenation of less than 0.1 %, in no case, of more than 0.2 %. A reduction using these catalysts leads therefore to very pure end products so that expensive purification operations of the amines are not required. Moreover, the yields are between 95 and 98 % of the theoretical yields. Another substantial advantage of the catalysts prepared according to the invention is that they can be used for several reductions without perceptible loss of activity and selectivity. Depending on the type of the nitro compound to be reduced, the sulfited platinum on carbon catalyst of the invention can thus be used for about 20 to 50 reductions, the results being always the same. This property is particularly essential for an economic preparation of halogenated amines, owing to the high platinum price. Another advantage of the process of the invention is that the properties of the catalysts prepared in accordance therewith are reproducible without difficulty.

It could not be foreseen that a sulfited platinum catalyst having the above-cited selective properties is obtained only if the treatment with a sulfitizing agent is preceded by a saturation of the platinum metal with hydrogen and, moreover, if a determined ratio of sulfitizing agent used to hydrogen absorbed is maintained. Unless, for example, the saturation with hydrogen is carried out, a catalyst is obtained which has a strong dehalogenating action and is therefore useless, though the amount of sulfitizing agent used is the same.

The following Examples serve to illustrate the invention.

EXAMPLE 1

In a flask provided with stirrer and filled with nitrogen, 25 g of a catalyst of the 5 %-platinum-on-carbon type (active surface area: about 800 m²/g, crystallite size; about 10 Angstrom units, metal surface: about 10 m²/g) were carefully suspended in 500 cc. of a 1 % aqueous sulfuric acid at a temperature of 25°C. The suspension was allowed to deposit and the nitrogen covering the liquid was expelled by means of hydrogen. Hydrogen was then fed via a gasometer on the carefully stirred suspension. After about 40 minutes, the saturation point was reached. The hydrogen consumption was about 620 cc. at 25°C. In the course of 10 minutes, a solution of 1.76 g of $Na_2SO_3$ in 50 cc. of water was then added dropwise, and stirring was continued for 60 minutes. The catalyst was separated by filtration from the liquid and washed with distilled water. It was used with a water content of about 50 %.

Comparative Example

A catalyst suspension was prepared as in Example 1 and — without preliminary treatment with hydrogen — the solution of 1.76 g of $Na_2SO_3$ in 50 cc. of water was added dropwise while stirring. Stirring was continued and the catalyst was isolated as in Example 1.

EXAMPLE 2

A solution of 1.39 g of $K_2S_2O_5$ (potassium disulfite) in 50 cc. of water was introduced while stirring, within 10 minutes at 25°C, into a suspension of a 5 % palladium on carbon catalyst as prepared according to Example 1 and saturated with hydrogen. Stirring was continued for 1 hour. The suspension was then worked up as in Example 1.

EXAMPLE 3

The process indicated in Example 2 was repeated using 1.38 g of $NaHSO_3$ instead of potassium disulfide.

EXAMPLE 4

The process according to Example 1 was modified inasfar as, upon saturation with hydrogen, the reaction vessel was evacuated to a pressure of about 100 mm mercury, and 330 cc. of $SO_2$ were fed in the apparatus while stirring within 5 minutes. After stirring had been continued for a short time, the sulfitation reaction was complete. The catalyst was then flushed with nitrogen and worked up as usual.

EXAMPLE 5

The catalyst obtained according to Example 1 was tested as to its activity in the catalytic reduction of 2,5-dichloronitrobenzene to 2,5-dichloroaniline. The tests were performed in a 2 1-autoclave made of stainless steel in the following manner:

6 Parts of the catalyst were admixed with a mixture of 414 parts of 2,5-dichloronitro-benzene and 360 parts of methanol and the mixture was reduced, at 90°–100°C, with a hydrogen pressure of 10 to 30 atmospheres gage. When reduction was complete, the catalyst was suction-filtered and the filtrate was worked up to yield 2,5-dichloro-aniline. The filtered catalyst was used for the following reduction without further purification. It could be used in this manner at least 30 times without a perceptible loss of activity being observed; the excellent selectivity was also preserved. For a reduction period of about 40 minutes per batch, 0.1 % of chlorine was split off, calculated on the weight of the chlorine present. The 2,5-dichloroaniline was obtained with great purity and in a yield of about 97 % of the theoretical yield.

In contrast thereto, the catalyst prepared according to the process of the Comparative Example showed an intense activity accompanied by a dechlorination of more than 2 %; hence it was useless.

EXAMPLE 6

The catalysts obtained according to Examples 2 to 4 were also tested for their activities in the catalytic reduction of 2,5-dichloronitro-benzene. Being used with the same frequency and under the same reaction conditions, the catalysts provided the same results as a platinum on carbon catalyst sulfited with $Na_2SO_3$.

EXAMPLE 7

A stainless steel autoclave provided with magnetic stirrer, heating jacket and cooler contained a mixture of
2.16 mols of o-chloronitrobenzene,
355 g of methanol,
0.15 g of platinum, in the form of 6 g of moist 5 % platinum on carbon catalyst, sulfited.

After air had been expelled from the reactor by means of nitrogen and the reactor had been flushed with hydrogen the starting mixture was heated to 60°–70°C, then hydrogen was introduced while stirring under an average pressure of 25 atmospheres gage. Reduction started immediately with development of heat and with a drop in hydrogen pressure. The temperature was allowed to rise to 95°C on an average and then kept constant with cooling. The hydrogen pressure was readjusted to the initial value upon a drop of 10 atmospheres. When there was no more reduction in hydrogen pressure, the reduction mixture was stirred for another 20 minutes under a pressure of 25 atmospheres at 95°C. The whole reduction took 60 to 70 minutes. After pressure release the mixture was filtered at 50°C and the catalyst was used for the following batch. In the organic filtrate, the percentage of dechlorination was determined by titration with 1N NaOH. Subsequently, the catalyst was worked up by distillation as usual.

Yield of o-chloroaniline 97 % of the theoretical yield, softening point : −1.9°C, diazo value : 99.8 %, halogen split off : less than 0.1 %, minimum frequency of application of catalyst : 50 times.

EXAMPLES 8 TO 18

According to the process disclosed in Example 7, the following halogenated amines were prepared :

| Example | Amine | Yield % of theory | Softening point °C | Diazo value | Halogen split off in % | Number of operations of the catalyst without loss of activity |
|---|---|---|---|---|---|---|
| 8 | m-chloro-aniline | 97 | −10.0 | 99.8 | <<0.1 | 30 |
| 9 | p-chloro-aniline | 96.5 | 69.7 | 99.9 | <<0.1 | 30 |
| 10 | 2,4-chloro-toluidine | 98 | 23.3 | 99.6 | <0.1 | 40 |
| 11 | 4,2-chloro-toluidine | 97.5 | 22.7 | 99.8 | <<0.1 | 25 |
| 12 | 6,2-chloro-toluidine | 98.8 | 3.7 | 99.8 | 0.02 | 25 |
| 13 | 3,4-chloro-aniline | 96.2 | 71.6 | 99.9 | 0.1 | 30 |
| 14 | 2-chloro-p-anisidine | 98.5 | 60.4 | 98.3 | 0.2 | 20 |
| 15 | 3-amino-benzotrifluoride | 94 | 5.6 | 99.6 | <0.1 | 30 |
| 16 | 4-chloro-3-amino-benzotrifluoride | 95 | 10.9 | 99.7 | 0.1 | 20 |
| 17 | p-fluoroaniline | 95 | −1.6 | 99.6 | <0.1 | 15 |
| 18 | o-bromoaniline | 95 | 29.5 | 99.6 | 0.2 | 12 |

We claim:
1. In a process for the hydrogenation of a halonitroaromate of the formula

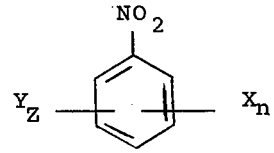

wherein
X is halogen,
Y is hydrogen, trifluoromethyl or alkyl or alkoxy of 1 to 4 carbon atoms each, and Z and n are each 1 to 3 with the proviso that the sum of Z and n does not exceed 5;
the improvement comprising hydrogenating the halonitroaromate in the presence of a catalyst obtained by suspending a particulate platinum on carbon catalyst having an effective surface of at least 800 m²/g in an aqueous medium of a pH in the range of 0 to 5, saturating with hydrogen at a pressure in the range of normal pressure to 1 atmg, admixing with 0.3 to 0.7 mol of a sulfitizing agent per each mol of hydrogen absorbed and isolating the catalyst from the aqueous medium.

* * * * *